United States Patent Office 3,702,350
Patented Nov. 7, 1972

3,702,350
POLYESTER FIBERS WITH ALIPHATIC SULPHONIC ACID CONTAINING ANTISTATIC AGENTS
Isao Kimura and Fumimaro Ogata, Osaka, and Koichiro Ohtomo, Settu, Osaka-fu, Japan, assignors to Kanegafuchi Boseki Kabushiki Kaisha, Tokyo, Japan
No Drawing. Continuation-in-part of application Ser. No. 30,212, Apr. 20, 1970. This application July 12, 1971, Ser. No. 161,883
Claims priority, application Japan, Apr. 22, 1969, 44/31,415
Int. Cl. C08g 45/14
U.S. Cl. 260—835
10 Claims

ABSTRACT OF THE DISCLOSURE

A fiber having durable antistatic and hydrophilic properties to withstand repeated launderings, which comprises a polymer composition consisting of 99.95–60% by weight of a synthetic linear polyester or polyesterether and 0.05–40% by weight of at least one sulphonic acid containing compound which is prepared by sulphonating an epichlorohydrin homopolymer or an alkyleneoxide/epichlorohydrin block copolymer. The sulphonic acid containing compound may contain also an active chlorine atom, unsaturated methylene group or epoxy group.

CROSS REFERENCE TO RELATED APPLICATION

This application is a continuation-in-part of our copending application Ser. No. 30,212, filed Apr. 20, 1970, now Pat. No. 3,637,900.

This invention relates to polyester or polyesterether fibers having durable antistatic and hydrophilic properties.

Numerous synthetic fibers formed of thermoplastic synthetic linear polymers, are known and those formed from polyamides and polyesters, which have been manufactured on the largest industrial scale, are very hydrophobic as compared with natural fibers. The hydrophobic properties of such fibers lead to a number of disadvantages. Thus hydrophobic fibers and clothes made therefrom may have a waxy feel, a poor fit, a tendency to be stained with oil and greases which stains are difficult to remove, a tendency to develop electrostatic charges by friction and thus attract dust, and various uncomfortable wearing properties.

In order to overcome these disadvantages, numerous synthetic fibers having antistatic and hydrophilic properties have been proposed. However, most of those proposals comprise providing the synthetic fibers or textile products woven therefrom with temporary antistatic and hydrophilic properties by a surface treatment. It has also been proposed to incorporate an antistatic or hydrophilic agent into the synthetic fiber-forming polymer prior to spinning but most synthetic fibers produced therefrom lose their inherent useful characteristics.

It has now been found, in accordance with the present invention, that certain additives, as hereinafter defined, may be incorporated in polyesters or polyesterethers to give them durable antistatic and hydrophilic properties.

According to the invention there is provided a fiber having lasting antistatic and hydrophilic properties to repeated launderings which comprises a polymer composition comprising from 99.95 to 60% by weight of thermoplastic linear polyester or polyesterether and from 0.05 to 40% by weight of at least one sulphonic acid containing compound of the formulae:

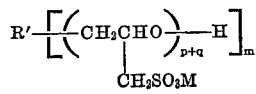

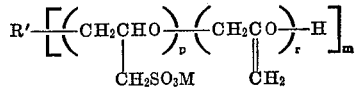

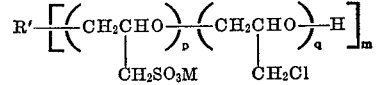

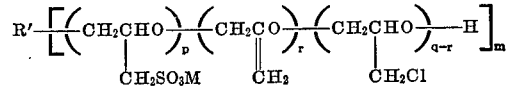

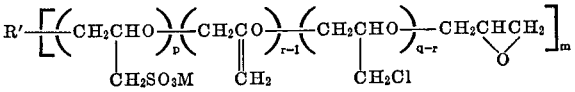

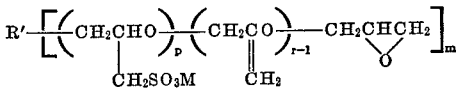

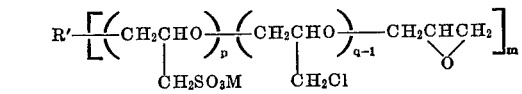

and,

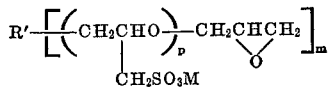

where $m$ is an integer of 1 or 2 and when $m$ is 1, $R'$ is a hydrogen atom or a group, $R_1O$— or $R_1O(RO)_n$ wherein $R_1$ denotes a hydrogen atom, or an alkyl, aralkyl or alkylphenyl group having 1–18 carbon atoms in its alkyl group, or a cycloalkyl group having an alicyclic ring containing 3–8 carbon atoms, or an acyl group having 1–18 carbon atoms, R denotes ethylene, propylene or tetramethylene group and $n$ is an integer not more than 454 and when $m$ is 2, $R'$ denotes —O—$(RO)_n$— wherein R and $n$ are the same as defined above; $p$, $q$ and $r$ are integers satisfying simultaneously the inequalities: $2 \leq p+q \leq 30$, $1 \leq p$ and $1 \leq r \leq q \leq 6$; and M denotes a hydrogen atom, an alkali metal or alkaline earth metal atom.

In the formulae, the polyoxyalkylene group —$(RO)_n$— is intended to refer to a homopolymer of ethylene oxide, propylene oxide or tetramethylene oxide, or a random or block copolymer of two or more such alkylene oxides. The polyoxyalkylene group may suitably have an average molecular weight of up to 20,000, more preferably not more than 10,000. When the average molecular weight is over 20,000, the concentration of —$SO_3M$ groups in the molecule of the sulphonic acid containing compound decreases and a desirable result may not be obtained.

The alkyl groups having 1–18 carbon atoms as $R_1$ groups include for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl, and also include an aralkyl group such as benzyl, methylbenzyl, hexylbenzyl, heptylbenzyl, octylbenzyl, nonylbenzyl, decylbenzyl, and undecylbenzyl group.

The alkylphenyl groups signify phenyl groups substituted with 1–3 alkyl groups having 1–18 carbon atoms. Examples of such alkylphenyl groups are methylphenyl, n-butylphenyl, isobutylphenyl, amylphenyl, dibutylphenyl, diamylphenyl, tripropylphenyl, heptylphenyl, octylphenyl, nonylphenyl, decylphenyl, undecylphenyl, tridecylphenyl, tetradecylphenyl, cetylphenyl, oleylphenyl, octadecaphenyl, dihexylphenyl, trihexylphenyl, diheptylphenyl, dioctylphenyl, di-nonylphenyl, and dodecylphenyl groups.

Examples of the cycloalkyl groups are cyclopropyl, cyclobutyl, cyclopentyl, cyclohexyl, cycloheptyl, cyclooctyl groups.

The carboxylic acid from which the acyl group having 1–18 carbon atoms is derived may be, for example, butyric acid, caproic acid, caprylic acid, capric acid, lauric acid, myristic acid, palmitic acid, stearic acid, oleic acid or ricinoleic acid.

The groups M may be, for example, a hydrogen atom, an alkali metal such as lithium, sodium or potassium or an alkaline earth metal such as magnesium, calcium, zinc or barium. In particular when M is an alkaline earth metal, the water-solubility of the sulphonic acid group containing compounds can be reduced and further it may happen that these metals bond to the sulphonic acid groups of different molecules to markedly reduce the solubility of the compound.

The term "polyester fiber" as herein used signify fibers of polyesters or polyesterethers.

The most representative polyesters for use in the present invention are polyethylene terephthalate (hereinafter referred to as PET) and modified polyesters predominantly comprising PET which is a polycondensation product of PET forming materials and at least one bifunctional ester-forming material. The said bifunctional ester-forming material is an aliphatic diol such as diethylene glycol, trimethylene glycol, or tetramethylene glycol; an alicyclic diol such as 1,4-cyclohexane dimethanol or 1,4-cyclohexane diol; an aliphatic dicarboxylic acid such as adipic acid, sebacic acid or 1,10-decane dicarboxylic acid; an aromatic dicarboxylic acid such as isophthalic acid, sodium sulphoisophthalic acid or naphthalene dicarboxylic acid; an alicyclic dicarboxylic acid such as hexahydroterephthalic acid or hexahydroisophthalic acid; a hydroxycarboxylic acid such as p-hydroxybenzoic acid, vanilic acid, or ethylene glycol-p-hydroxybenzoic acid ether; and functional derivatives thereof.

Polyesterethers which may be used in the present invention include polyethylene oxybenzoate and various copolymers predominantly comprising polyethylene oxybenzoate.

The polyesters or polyesterethers may, if desired, contain conventional additives such as delustrants, pigments, dyestuffs, light stabilizers, fluorescent brightening agents, heat stabilizers and plasticizers.

The amount of the sulphonic acid containing compound to be incorporated into the polyesters or polyesterethers is from 0.05 to 40% by weight based on the total weight of the composition, preferably from 0.1 to 30% by weight and advantageously from 0.5 to 10% by weight. When the content of the sulphonic acid containing compound in the polymer composition is within the above mentioned range, a fiber having good durable antistatic and hydrophilic properties is obtainable from the polymer composition as such, without substantially reducing the useful properties inherent in fibers formed of polyesters or polyesterethers, e.g., the wash-and-wear properties, heat stability, heat settability and high Young's modulus. If the sulphonic acid containing compound content is less than 0.05% by weight, insufficient antistatic and hydrophilic properties may be imparted to the polyester fibers, while if it is in excess of 40% by weight the various useful properties inherent in the polyester fibers as mentioned hereinabove may be adversely affected.

The sulphonic acid containing compound may be in the form of a liquid, grease or wax, and it may be added to the polyesters or polyesterethers in the form of an aqueous solution or an aqueous dispersion.

The sulphonic acid containing compound can be incorporated in the polyesters or polyesterethers in a uniformly dispersed state by adding it prior to the ester interchange reaction or at a time between the ester interchange reaction and the polycondensation reaction, or after the polycondensation reaction; it being preferred to add it after the ester interchange reaction and before polycondensation reaction.

Further, an excess of the sulphonic acid containing compound over the amount required may be added to the polyesters or polyesterethers before, during or after the polymerization reaction to prepare a master chip having a high sulphonic acid containing compound content, and the master chip may then be incorporated with the polyesters or polyesterethers by adding it before, during or after the polymerization reaction. Alternatively, the master chip and a polyester or polyesterether chip containing no sulphonic acid containing compound can be blended mechanically, or those chips can be conjugated to form a composite chip which is thereafter melt spun to give a synthetic polyester fiber comprising a polyester or polyesterether composition having the sulphonic acid containing compound uniformly incorporated therein.

The sulphonic acid containing compounds used in the present invention have almost the same melting points as compared with similar compounds containing no sulphonic acid group and have such a high melt viscosity that they have good compatibility and miscibility with polyesters or polyesterethers and a good dispersibility therein, so that uneven dispersion or a phase separation during the polymerization, melt blending or melt spinning steps do not occur.

In particular, when the sulphonic acid containing compound contains another active group such as an active chlorine atom, an epoxy group or an unsaturated methylene group, the active group links firmly with another active group in the polyester or polyesterether so that any tendency to separation of the components of the composition is markedly reduced to give a polymer composition having lasting antistatic and hydrophilic properties.

It is an important feature of the sulphonic acid containing compounds that they have a good compatibility with polyesters or polyesterethers whilst similar compounds containing no sulphonic acid group do not have such good compatibility.

When the polymer composition comprising a sulphonic acid group containing compound and a polyester or polyesterether is melt-spun, the filament obtained is drawn and a synthetic polyester fiber having good antistatic hydrophilic properties is obtained.

Either cold drawing or hot drawing may be employed. However, it has surprisingly been found that the polyester fibers of the present invention undergo a marked improvement in their lasting antistatic and hydrophilic properties when hot drawn.

The sulphonic acid containing compounds used in the present invention may be prepared as follows:

(a) Preparation of sulphonic acid containing compounds from a diol type polyalkylene oxide A diol type polyalkylene oxide (Formula 1) is melted by heating and reacted with epichlorohydrin in the presence of boron trifluoride or a Friedel-Crafts' catalyst to form a block copolymer of a polyalkylene oxide and epichlorohydrin (Formula 2). If a small amount of water is present in the reaction mixture, the water may possibly add onto a ring-opened epoxy group and an oligomer may be formed.

The thus-obtained block copolymer (Formula 2) is dispersed or dissolved in water and thereafter sulphonated by adding a suitable amount of a sulphonating agent, e.g., alkali sulphite such as sodium sulphite. Here, when all the active chlorine atoms in the side chains of the polymer are to be sulphonated, the sulphonation can be effected by adding molar excess of sodium sulphite to the chlorines, allowing to react them at 90–100° C. for 20–30 minutes to yield a transparent, homogeneous solution, thereafter cooling the solution and further adding a lower alcohol, e.g., methanol, ethanol, isopropanol and the like in a ca. 3-fold amount of the reaction mixture as above-mentioned thereto to precipitate out excess sodium sulphite and the reaction by-product, i.e., sodium chloride. The obtained polymer product (Formula 3) may be recovered by a filtration and distilling off the solvent.

Alternatively a polymer product (Formula 4) in which the active chlorines are partly sulphonated is obtained in a similar procedure described above.

Further when the partly sulphonated product (Formula 4) is subjected to dehydrochlorination by equimolar amount of an alkali hydroxide, e.g., sodium hydroxide to the active chlorines in water or a lower alcohol such as methanol, ethanol, or isopropanol or in a non-polar solvent such as benzene, or toluene, epoxy and methylene groups can be readily introduced in terminals or side chains of the polymer molecule and thus polymer products (Formulae 5, 6) are obtained. On the other hand, when the dehydrochlorination is conducted by addition of less than equimolar amount of an alkali hydroxide, e.g., sodium hydroxide to the active chlorines, then products having active chlorines and epoxy groups in the polymer molecules may be obtained (Formulae 7, 8).

Thus, any functional group such as active chlorines, methylene group or epoxy group can be introduced into the sulphonic acid containing product.

The above processes are represented by the following reaction scheme:

(b) Preparation of a sulphonic acid containing compound having no polyalkylene oxide therein Epichlorohydrin is polymerized with the compound, $R_1OH$ in an organic solvent, e.g., carbon tetrachloride, in the presence of the same catalyst as employed in Preparation (a) above. The homopolymer of epichlorohydrin thus obtained (Formula 9) is treated with a sulphonating agent such as sodium sulphite at a temperature of 100 to 200° C. under atmospheric pressure or under superatmospheric pressure if required, to sulphonate all or a part of the chlorinated methyl groups to obtain the respective products (Formula 10 for the former or Formula 11 for the latter).

The partly sulphonated product (Formula 11) is further subjected to dehydrochlorination reaction by equimolar or less amount of an alkali hydroxide e.g., sodium hydroxide to the chlorines to yield respective products (Formulae 12 and 13 for the former case or Formulae 14 and 15 for the latter case).

Thus a sulphonic acid containing compound having any amount of functional groups in its molecule may be obtained as desired, as in the case of (a) above.

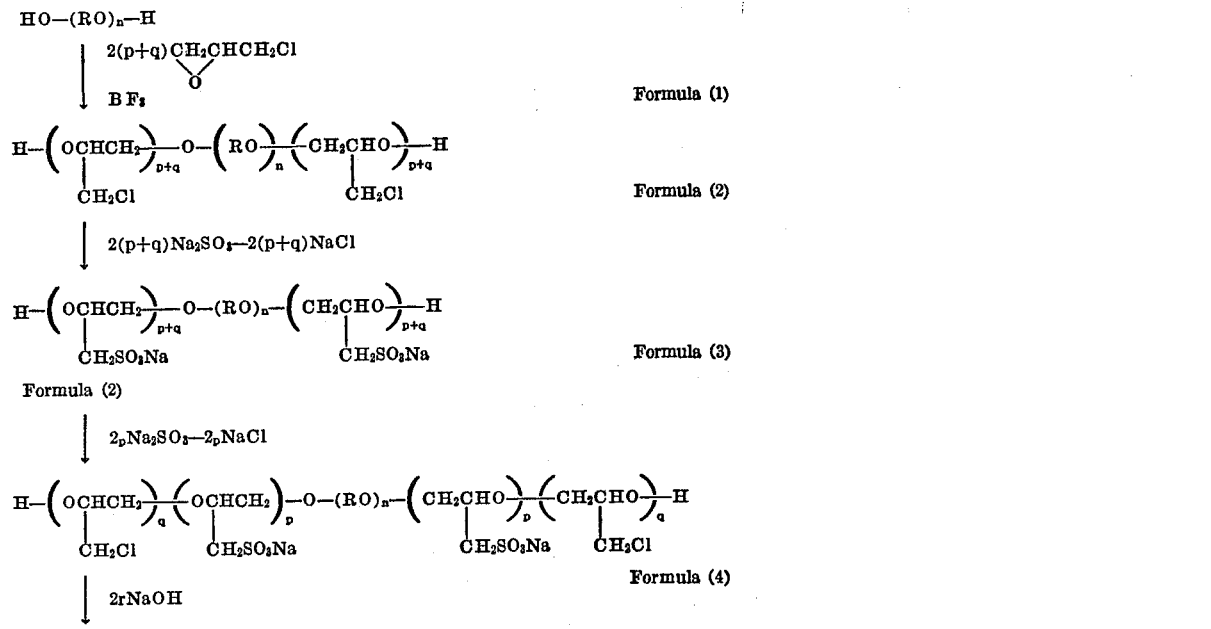

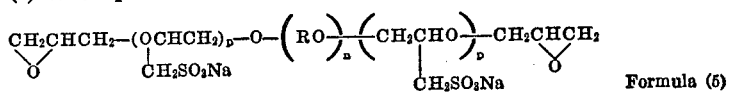

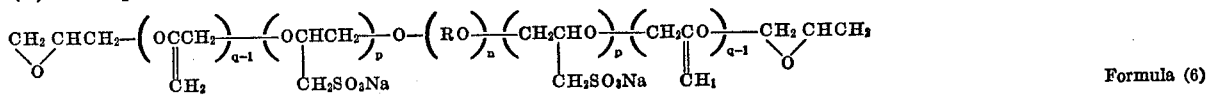

Formula (6)

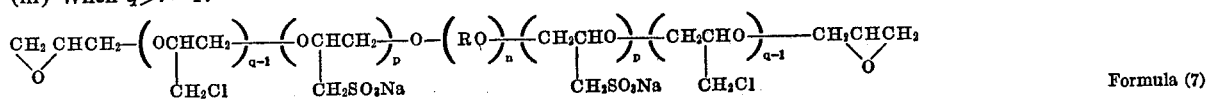

Formula (7)

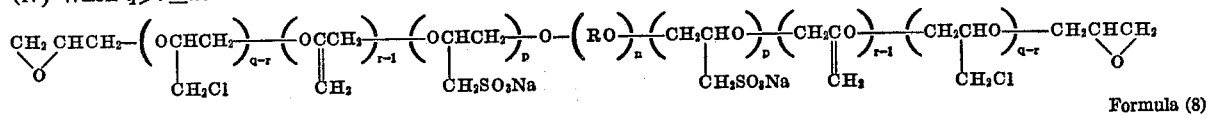

Formula (8)

The reaction processes are, for example, shown by the following scheme:

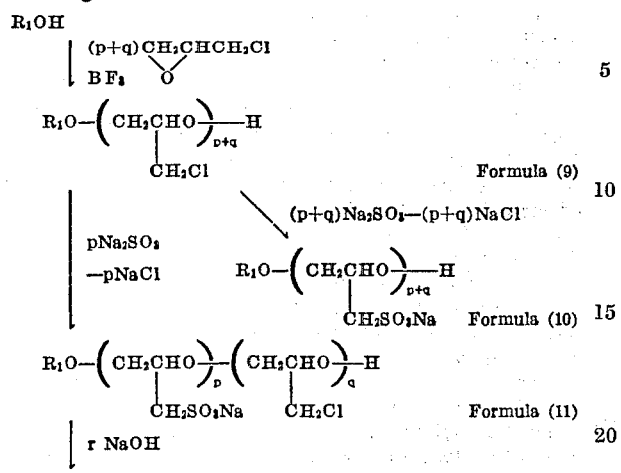

Formula (9)

Formula (10)

Formula (11)

(i) when $q=r=1$:

Formula (12)

(ii) When $q=r\geq2$:

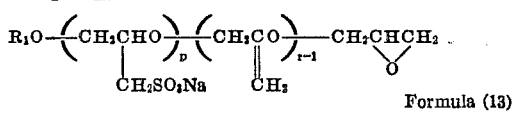

Formula (13)

(iii) When $q>r=1$:

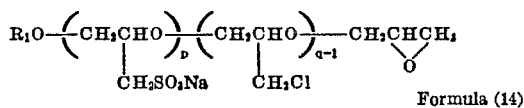

Formula (14)

(iv) When $q>r\geq2$:

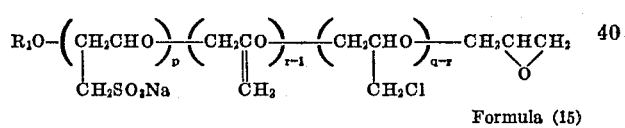

Formula (15)

(c) A preparation of a sulphonic acid containing compound from a monool type polyalkylene oxide (Formula 16)

The preparation is effected in an identical procedure to Prepaartions (a) or (b) above with respect to polymerization, sulphonation and dehydrochlorination. For example, the reaction scheme is shown as follows:

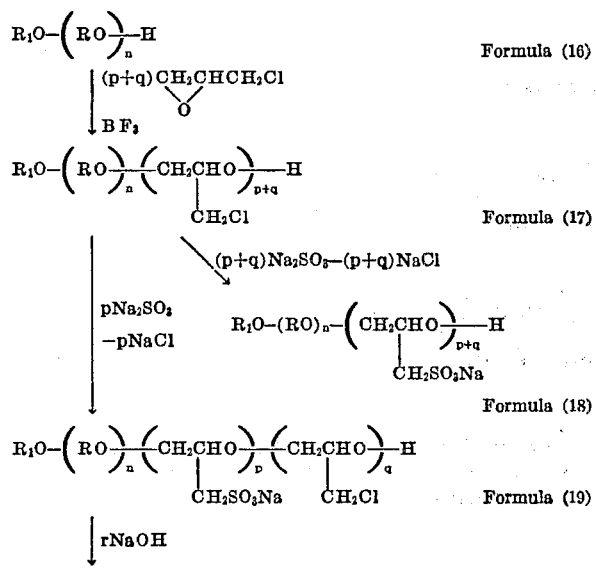

Formula (16)

Formula (17)

Formula (18)

Formula (19)

(i) When $q=r=1$:

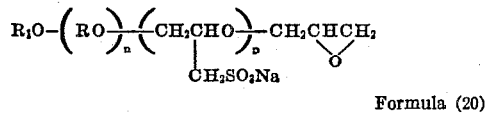

Formula (20)

(ii) When $q=r\geq2$:

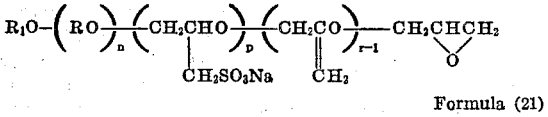

Formula (21)

or

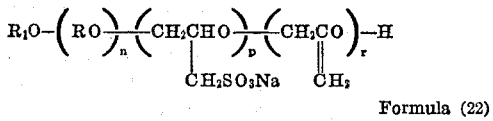

Formula (22)

(iii) When $q>r=1$:

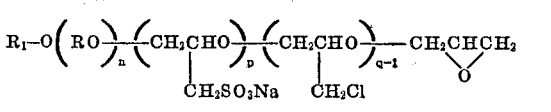

Formula (23)

(iv) When $q>r\geq2$:

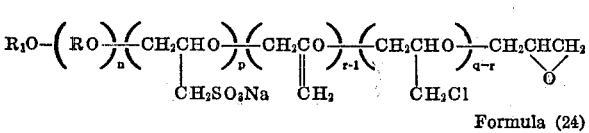

Formula (24)

or

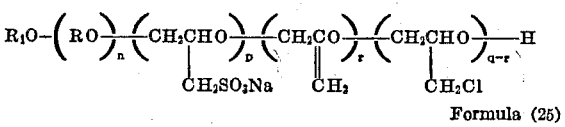

Formula (25)

In the preparation, the copolymer of polyalkylene oxide and epichlorohydrin (Formula 17) is wholly sulphonated to yield a product (Formula 18), while partly sulphonated to yield a product (Formula 19). Then, the partly sulphonated product (Formula 19) is completely subjected to dehydrochlorination to yield products (Formulae 20, 21 and 22), while partly subjected to dehydrochlorination to yield products (Formulae 23, 24 and 25).

A compound having at least one combined —SO₃M group in its molecule is markedly different in melting point or in melt viscosity from a similar compound containing no —SO₃M group. For example, a block copolymer of a polyalkylene oxide having no sulphonic acid group and having a molecular weight of about 10,000 and epichlorohydrin tends to become a liquid as the tendency of its block copolymerization is increased. Further, an epichlorohydrin homopolymer having a molecular weight of about 10,000 or less is not solid but is liquid or greasy at room temperature. Both the above block copolymer and the epichlorohydrin homopolymer have a markedly low melt viscosity at 200–300° C. However, the sulphonic acid containing compound prepared by introducing sulphonic acid group into the above block copolymer or epichlorohydrin homoploymer is a crystalline solid at room temperature having a narrow softening point range and an extremely high melt viscosity at 200–300° C.

The softening point and the viscosity of the sulphonic acid containing compound are significant in the formation of a uniform polymer composition comprising the sulphonic acid containing compound and a polyester or polyesterether. Thus, when the melt viscosity of the sulphonic acid containing compound is close to that of the polyester or polyesterether, the compound has good dispersibility and miscibility with the polymer, and the spinnability and drawability of the filament are improved. The uniform miscibility of the sulphonic acid containing compound in the polymer is improved as compared with conventional compounds, since the compound is a solid substance having a high melt viscosity.

The sulphonic acid containing compound increases in hydrophilicity with increase in sulphonic acid group content and, indeed, becomes water soluble when the sulphonic acid group content is very high.

Synthetic polyester or polyesterether fibers composed of a polymer composition comprising the sulphonic acid containing compound and textile products made therefrom possess substantially durable antistatic and hydrophilic properties which can sufficiently withstand various treatments or repeated launderings, particularly when the compound has high enough molecular weight, e.g., from 400 to 20,000.

When the polyalkylene oxide is an aqueous insoluble polyether such as polypropylene glycol (hereinafter referred to as PTG), it is possible to control the hydrophilic-hydrophobic balance of the sulphonic acid containing compound by introducing an appropriate amount of sulphonic acid groups into the compound. Further, if other functional groups such as active chlorine atoms, methylene groups or epoxy groups are introduced into the molecules of the compound and the resulting compound is incorporated into a polyester or polyesterether, the active chlorine atoms, methylene groups or epoxy groups in the sulphonic acid containing compound react with and are firmly combined with the polyester or polyesterether.

The fibers of the present invention are generally comfortable to wear as compared with hydrophobic fibers and have a hand similar to that of natural fibers. Thus, they are suitable as raw materials for various garments, upholstery and industrial goods, in the form of fibers or other shaped articles.

The following examples are given by way of illustration only so that the invention may be well understood. In the examples all parts and percentages are by weight unless otherwise stated. The inherent viscosity of the polyesters (polyesterethers) was determined in orthochlorophenol solvent at 30° C.

The test-pieces for the determinations of water absorbency and triboelectric voltage, were drawn yarns which were washed in an 0.2% aqueous solution of a household detergent at 80° C. for 30 minutes, rinsed five times in hot water and dried.

The triboelectric voltage was determined as follows:

A yarn test piece was conditioned for 24 hours at 20° C. and 65% R.H. and thereafter pulled over a titan porcelain body at a speed of 100 meters per minute under a constant tension exerted thereupon by a tension washer, to generate triboelectricity, the voltage of which was measured by an electrostatic induction method by means of a rotatory sector.

EXAMPLE 1

Five hundred parts of polyethylene glycol (hereinafter referred to as PEG) having an average molecular weight of 4,000 which had been completely dehydrated was melted at 70° C. in a vessel and 2.5 parts of 47% boron trifluoride etherate was added to the melt. The mixture was thoroughly stirred and 70 parts of epichlorohydrin (hereinafter referred to as EP) was added dropwise thereto over a period of 2 hours to react therewith at 65–70° C. After completion of the addition, the reaction mixture was stirred for a further hour at the same temperature and the catalyst and a small amount of unreacted ingredients were distilled off under a reduced pressure on a boiling water bath. The thus-obtained PEG-EP block copolymer was dissolved into 1500 parts of water and the solution was added with an aqueous sodium hydroxide solution to neutralize the acidity of the $BF_3$ employed as catalyst. 75.7 parts of sodium sulphite was then added to the neutralized solution while stirring at 80° C. After the reaction mixture had become homogeneous, stirring was continued for a further hour and then the mixture was cooled to room temperature and neutralized by hydrochloric acid to pH 7. The reaction mixture was then concentrated under reduced pressure on a heating water bath to distill off completely the water. The waxy product so obtained was dissolved in 2000 parts of 99.5% ethanol to precipitate and filtrate the by-product, sodium chloride and the ethanol solution was concentrated under reduced pressure to distill off all the ethanol to give a solid sulphonic acid containing compound. The product contained 3.75% of combined sulphur and had a degree of sulphonation of 97%.

It was believed that the resultant product was a mixture having the following average structural formulae:

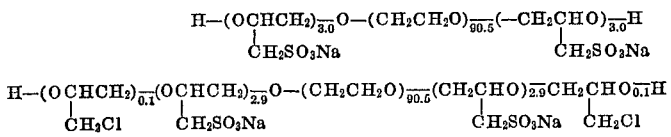

One hundred parts of dimethyl terephthalate (hereinafter referred to as DMT), 70 parts of ethylene glycol (hereinafter referred to as EG), 0.02 part of zinc acetate, 0.04 part of stibium oxide, 0.03 part of triphenylphosphite and 0.4 part of titanium oxide were placed in an autoclave previously purged with nitrogen gas. The mixture was heated at 180° C. for 3 hours in a nitrogen gas flow under atmospheric pressure and further heated at an elevated temperature of 230° C. for 3 hours to perform ester interchange reaction while distilling off continuously the resulting methanol from the reaction system. The reaction product thus obtained was added with 3 parts of the sulphonic acid containing compound and the temperature was raised to 285° C., the mixture being maintained under reduced pressure over a period of 2 hours and finally under a vacuum pressure of 0.5 mm. Hg for 4 hours to perform the polycondensation reaction. Nitrogen gas was then introduced into the autoclave and the resultant polymer was extruded from the bottom of the vessel under a nitrogen pressure of 3 kg./cm.² (gauge pressure) in the form of gut, quenched and solidified in a water bath and then cut into chips of 3 mm. in diameter and 3 mm. in length. By way of comparison, the polymer chips were prepared in the same procedure as above except that the sulphonic acid containing compound was not used.

The chips were each dried at 120° C. under a reduced pressure of 0.1 mm. Hg, fed to an extrusion spinning apparatus, melt-spun at a cylinder temperature of 285° C. and at a spinneret temperature of 280° C. and wound up on a bobbin. The undrawn yarns were hot drawn to 4.2 times their original length on a draw-pin heated to 90° C. and immediately heat-set by passing over a plate heated to 150° C. to give drawn yarns of 40 denier of 18 filaments. The properties of the thus-obtained yarns are shown in Table 1.

TABLE 1

| | Polymer | | Percent | | | |
|---|---|---|---|---|---|---|
| | Water soluble component (percent) | Intrinsic viscosity | Tensile strength at break (g./den.) | Elongation at break | Water absorbency of fiber | Triboelectric voltage (v.) |
| This invention | 0.5 | 0.63 | 4.1 | 21.5 | 4.2 | 120 |
| Comparison | 0.3 | 0.65 | 4.3 | 20.8 | 1.6 | 1,700 |

As is apparent from Table 1 the polyester fibers containing the sulphonated derivative of the present invention have good antistatic property and moisture absorbability. These good properties hold after repeated launderings.

EXAMPLE 2

Polyester copolymer chips were prepared by charging 90 parts of DMT, 10 parts of isophthalic dimethyl ester, 70 parts of EG, 0.02 part of zinc acetate, 0.04 part of stibium oxide and 0.3 part of titanium oxide in an autoclave, carrying out ester interchange reaction in an orthodox manner, and thereafter performing polycondensation reaction under reduced pressure.

The sulphonated PEG derivative prepared in Example 1 was fully dried and granulated, and mixed well in various proportions with the copolymerized polyester chips prepared as above. The mixtures were each charged into a hopper previously sealed with dry nitrogen gas and melt blended in a mono-screw extruder having a barrel diameter of 40 mm. heated to 285° C., and extruded therefrom as a gut which was again cut into chips. The resultant chips were dried at 120° C. under a reduced pressure of 0.1 mm. Hg and melt extruded and the spun yarns were drawn in the same manner and under the same conditions as described in Example 1 to give drawn yarns of 75 denier of 36 filaments. The properties of the yarns are shown in Table 2.

TABLE 2

| Mixing proportion (percent) | | Yarn property | | | |
|---|---|---|---|---|---|
| Copolymerized polyester | Sulphonated derivative | Tensile strength at break (g./d.) | Elongation at break (percent) | Water absorbency of fiber (percent) | Triboelectricity voltage (v.) |
| 100 | 0 | 4.9 | 20.7 | 1.2 | 1,500 |
| 99.95 | 0.05 | 4.9 | 20.5 | 1.8 | 1,100 |
| 99.9 | 0.1 | 4.8 | 20.9 | 2.0 | 700 |
| 99.5 | 0.5 | 4.6 | 21.2 | 2.5 | 450 |
| 99 | 1 | 4.7 | 21.0 | 3.1 | 230 |
| 95 | 5 | 4.3 | 22.1 | 5.2 | 70 |
| 90 | 10 | 4.1 | 21.9 | 7.1 | 50 |
| 70 | 30 | 3.8 | 24.5 | 9.2 | 40 |
| 60 | 40 | 3.4 | 28.6 | 9.8 | 40 |
| 50 | 50 | 3.0 | 31.2 | 10.0 | 40 |

The above results show that when sulphonated derivative content is not less than 0.05%, moisture absorbing and antistatic electrification effects are observed and, in particular, when the content is 0.1–30% or more preferably 0.5–10%, better reslts are obtained. If the content is in excess of 40%, the tensile strength of the fibers is decreased to a greater extent.

The PEG used as starting material in Example 1 and the PEG-EP block copolymer derived therefrom as an intermediate were each mixed with the copolymerized polyester chips in the same proportion as above and it was attempted to melt blend the mixture in an extruder. However, in both cases the polymer was softened at the entrance of the hopper, so that it did not enter the screw barrel but formed a lump and the desired polymer blend could not be obtained.

EXAMPLE 3

A PEG-EP block copolymer was prepared as described in Example 1, except that there were used 500 parts of PEG having an average molecular weight of 8000 and 1.6 parts of 47% etherate of $BF_3$, and 35 parts of EP was added to the stirred molten mixture at 60° C. The copolymer so obtained was dissolved in 1500 parts of water and 30 parts of sodium sulphite was added thereto at 80° C. while stirring to sulphonate ⅔ the active chlorine atoms in the polymer. To the aqueous solution of partially sulphonated PEG derivative thus obtained there was added 5 parts of sodium hydroxide at room temperature to effect dehydrochlorination and the reaction mixture was then neutralized with hydrochloric acid and dehydrated in a similar manner to Example 1. Ethanol was added to the resultant product to precipitate by-product, sodium chloride which was filtered off. The ethanol was distilled off from the solution to give a solid sulphonic acid containing compound having a combined sulphur content of 1.4% and an epoxy value of 0.22 meq./g. It was believed that the resultant final product was a mixture having the following average structural formulae:

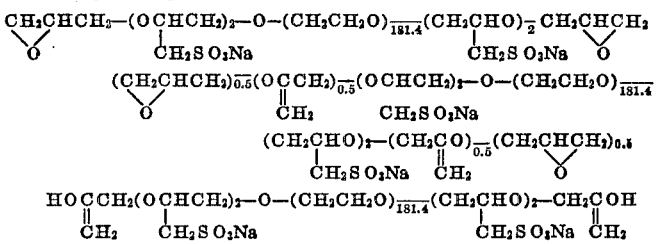

120 parts of parahydroxyethoxybenzoic acid methyl ester, 0.057 part of zinc acetate and 0.040 part of antimony trioxide were mixed and heated in nitrogen gas flow at 220° C. under atmospheric pressure to distill off methanol. Then the mixture was subjected to polycondensation reaction at 275° C. under reduced pressure in an ordinary manner to give polyester-ether chips of 2.5 mm. in diameter and 3 mm. in length.

After mixing well 3 parts of the sulphonic acid containing compound as mentioned above which was dried and granulated, and 97 parts of the polyesterether chips, the mixture was charged into an extruder at 280° C. through a hopper sealed completely with dry nitrogen gas and extruded to directly spin a yarn which was thereafter hot drawn to 4.2 times the original length on a draw pin heated to 90° C. to give a drawn yarn of 70 denier of 35 filaments. By way of comparison, the above-mentioned polyesterether chips only were spun and drawn under the same temperature conditions as above and wound up.

The yarn properties of each sample were determined and the results are shown in Table 3.

TABLE 3

| | | Yarn property | | | |
|---|---|---|---|---|---|
| | Water soluble component (percent) | Tensile strength at break (g./den.) | Elongation at break (percent) | Water absorbency (percent) | Triboelectric voltage (v.) |
| This invention | 0.5 | 4.3 | 26.6 | 4.2 | 80 |
| Comparison | 0.4 | 4.5 | 24.8 | 2.2 | 1,600 |

EXAMPLE 4

Fifty parts of PTG having terminal hydroxyl groups and an average molecular weight of ca. 1000 was melted at 60° C. To the melt was added 0.4 part of a 47% boron trifluoride etherate followed by the gradual addition, with stirring, of 28 parts of EP to give a PTG–EP block copolymer which was liquid at room temperature. The copolymer was then dispersed in a 1:1 ethanol/water mixture, to which 48 parts of potassium sulphite was added to form a suspension. The mixture was placed in an autoclave where a reaction was conducted for 3 hours at a temperature of 150° C. while stirring under a nitrogen atmosphere. After cooling, the reaction product was taken out, the precipitates were filtered off and the solvent distilled off. A large excess of 99.5% ethanol was added to the residue and by-product potassium chloride was filtered off. The ethanol was distilled off to give a sulphonic acid containing compound which was a wax at room temperature.

It was believed that the resultant product had the following average structural formula:

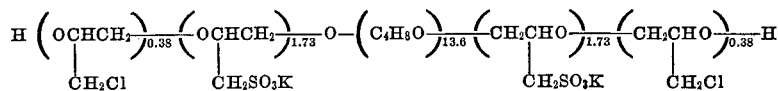

The product contained 8.1% of combined sulphur and 1.8% of active chlorine, and was dissolved in cold water in the form of a suspension. The product had a degree of sulphonation of 83%.

98 parts of PET chips having an inherent viscosity of 0.67 was mixed well with 2 parts of the powdery compound prepared above and the mixture was charged into a screw extruder having a barrel diameter of 40 mm. and a barrel temperature of 280° C., to melt blend the mixture. The melt was extruded in a form of a band which was again cut into chips. After drying, the resultant chips were fed into a screw extruder having a temperature of 285° C. and melt-spun to form a filament yarn which was wound on a bobbin. The undrawn yarn was hot drawn to 4.2 times its original length on a draw-pin heated to 90° C. and immediately heat-set by passing over a hot plate heated to 150° C., and a drawn yarn of 75 denier of 24 filaments containing the sulphonic acid containing compound was obtained. By way of comparison another drawn yarn was manufactured by spinning the same PET chips and drawing under the same conditions as above except that no sulphonic acid containing compound was used.

The test results obtained with respect to these yarns are given in Table 4.

TABLE 4

| Yarn sample | Intrinsic viscosity | Water soluble component (percent) | Tensile strength at break (g./den.) | Percent Elongation at break | Percent Water absorbency | Triboelectric voltage (v.) | Degree of whiteness (percent) |
|---|---|---|---|---|---|---|---|
| This invention | 0.65 | 0.4 | 4.2 | 22.5 | 5.3 | 50 | 85 |
| Comparison | 0.66 | 0.3 | 4.3 | 21.7 | 1.8 | 1,600 | 87 |

A tricot having a back-half texture was knit from the above prepared drawn yarn, washed successively in a detergent solution and water and dried. The water absorbing speed of the fabric was determined by dropping a drip of water onto the horizontally stretched fabric from 2 cm. above it and measuring the time required for the water to spread in a circle of 4 cm. diameter. The water absorbing speed of the fabric knit from the yarn of the present invention was 4 seconds, while the fabric knit from the comparative yarn did not absorb the water even after 6 minutes.

Further, in order to examine the effect of repeated launderings on the removal of the sulphonic acid containing compound from the fiber, the amount of combined sulphur was measured with respect to the yarn sample, which had been previously prepared by washing for the purpose of determining the water absorbency, and which had been further subjected to repeated launderings. The results are given in Table 5.

Frequency of launderings: Percent [1]
0 _____ 0.16
1 _____ 0.15
5 _____ 0.15
10 _____ 0.16
20 _____ 0.14

[1] Combined sulphur in the fiber.

It was attempted to melt blend the PTG with PET chips in the same proportions as above but the mixture could not be fed to the extruder due to its low softening point.

EXAMPLE 5

0.2 part of a 47% BF$_3$ etherate was added to 50 parts of PPG having a nonylphenol group at one end of its molecule and having an average molecular weight of 2000. 9.4 parts of EP was then slowly added to the mixture with stirring at 50° C. and a nonylphenol PPG–EP copolymer was obtained. The copolymer was dispersed in a mixture of 2 parts of methanol and 1 part of water, and 12 parts of sodium sulphite was added thereto. The mixture was reacted for 3 hours under reflux with stirring. 1.2 parts of sodium hydroxide was added to the reaction mixture and dissolved therein at 50–60° C. and stirred to effect dehydrochlorination. After neutralization the reaction mixture was concentrated by evaporating off the solvent under reduced pressure, and a large excess of ethanol was added to the concentrated mixture to precipitate out inorganic salts, which were then filtered off. Upon distilling off the ethanol, a waxy sulphonic acid containing compound having a combined sulphur content of 3.7% and an epoxy value of 0.38 meq./g. was obtained. It was barely soluble in cold water and believed to have the following average structural formula:

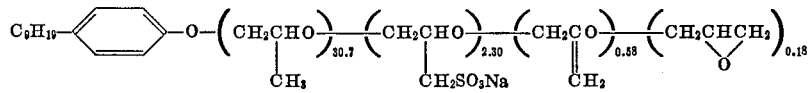

118 parts of parahydroxyethoxybenzoic acid methyl ester, 8 parts of the above reaction product, 0.059 part of zinc acetate and 0.041 part of antimony trioxide were placed in an autoclave previously purged with nitrogen. The mixture was heated at 220° C. under atmospheric pressure in a nitrogen atmosphere to distill off methanol, whereafter the temperature was raised to 250° C. and the pressure reduced to 70 mm. Hg, the mixture being maintained under these conditions for 3 hours and finally at a temperature of 270–280° C. for 4 hours under a pressure of 1 mm. Hg. Atmospheric pressure was then restored by introducing nitrogen into the autoclave and the resultant polymer was extruded from the bottom of the autoclave, under a nitrogen pressure of 3 kg./cm.$^2$, in the form of a band which was then cut into chips. By way of comparison, other polymer chips were prepared in the same manner and under the same conditions as above except that the sulphonic acid compound was not used. The chips were each dried and melt extruded at 280° C. to form filament yarns, using a screw extruder. The undrawn yarns were not drawn to 4.1 times their original length on a draw pin heated to 90° C. to give drawn yarns of 70 denier of 35 filaments. The properties of the obtained yarns are shown in Table 6.

TABLE 6

| Yarn sample | Intrinsic viscosity | Water soluble component (percent) | Tensile strength at break (g./den.) | Percent Elongation at break | Percent Water absorbency | Triboelectric voltage (v.) |
| --- | --- | --- | --- | --- | --- | --- |
| This invention | 0.60 | 0.65 | 4.0 | 28.2 | 6.8 | 50 |
| Comparison | 0.62 | 0.63 | 4.2 | 23.5 | 2.4 | 1,600 |

EXAMPLE 6

Forty-three parts of EP was dissolved in 100 parts of carbon tetrachloride and the solution was cooled to 5° C. 7.5 parts of a 47% boron trifluoride etherate was added to the solution and the mixture was reacted at 30–35° C. for 3 hours while stirring. Thus a greasy EP homopolymer was obtained by removing the carbon tetrachloride and the unreacted EP under reduced pressure. The homopolymer was dispersed in 300 parts of a 1:1 mixture of methanol and water. 50 parts of sodium sulphite was added to the dispersion and the mixture was reacted at 150° C. for 3 hours with stirring in an autoclave as in Example 4. The reaction product was taken out and 10 parts of sodium hydroxide was added thereto and dehydrochlorination was effected under reflux for 5 hours. After the solvent was distilled off, an excess of ethanol was added to the residue to precipitate inoragnic salts therefrom and the ethanol was distilled off to give a sticky final product. It was believed that the compound obtained had the following average structural formula:

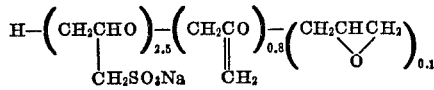

5 parts of the sulphonic acid containing compound and 95 parts of PET chips were well mixed with each other in a rotatory dryer adjusted to 80° C. and fed to a monoscrew extruder having barrel diameter of 40 mm. The mixture was melt blended at 285° C. and again cut into chips. After drying under reduced pressure, the resultant chips were melt-spun by means of an extruder having a barrel diameter of 20 mm. to form a filament yarn and the yarn was hot drawn to 4.0 times the original length to give a drawn yarn. By way of comparison, PET was spun and the spun yarn was drawn in the same manner as above, except that the sulphonic acid containing compound was not used. The results was shown in Table 7.

TABLE 7

| Yarn sample | Water soluble component (percent) | Tensile strength at break (g./den.) | Percent Elongation at break | Percent Water absorbency | Triboelectric voltage (v.) |
| --- | --- | --- | --- | --- | --- |
| This invention | 0.6 | 4.3 | 23.5 | 5.2 | 210 |
| Comparison | 0.3 | 4.4 | 22.1 | 1.8 | 1,800 |

What is claimed is:
1. A fiber having durable antistatic and hydrophilic properties which comprises a polymer composition consisting of 99.95–60% by weight of a thermoplastic linear polyester or polyesterether and 0.05–40% by weight of at least one sulphonic acid containing compound selected from the group consisting of:

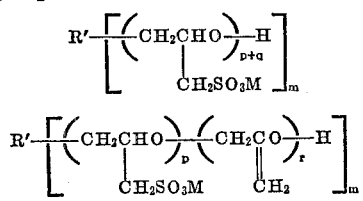

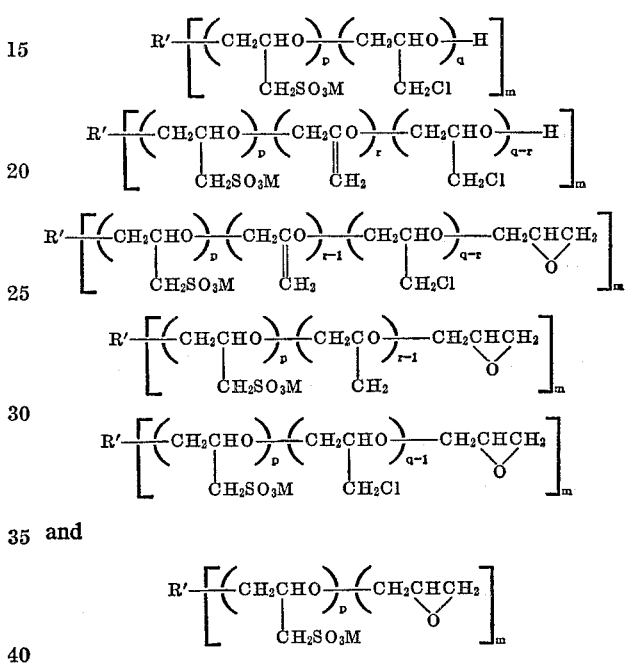

where, $m$ is an integer of 1 or 2; when $m$ is 1, R' denotes a hydrogen atom or a group, $R_1O-$ or $R_1O(RO)_n-$ wherein $R_1$ denotes a hydrogen atom, or an alkyl, aralkyl or alkylphenyl group having 1–18 carbon atoms in its alkyl group, or a cycloalkyl group having an alicyclic ring containing 3–8 carbon atoms, or an acyl group having 1–18 carbon atoms, $n$ is an integer not more than 454, and R denotes ethylene, propylene or tetramethylene group; and when $m$ is 2, R' denotes $-O(RO)_n-$ wherein R and $n$ denote the same as above; $p$, $q$ and $r$ are integers satisfying simultaneously the inequalities:

$$2 \leq p+q \leq 30, \quad 1 \leq p \text{ and } 1 \leq r \leq q \leq 6$$

and M denotes a hydrogen atom, an alkali metal or alkaline earth metal.
2. A fiber as claimed in claim 1, wherein the polyoxyalkylene group, $(RO)_n$ is a polymer group of ethyleneoxide, propyleneoxide or tetramethyleneoxide, or a random or block copolymer group thereof.
3. A fiber as claimed in claim 2, wherein the polyoxyalkylene group has an average molecular weight of not more than 20,000.
4. A fiber as claimed in claim 2, wherein the polyoxyalkylene group has an average molecular weight of not more than 10,000.
5. A fiber as claimed in claim 1, wherein the said polyester is polyethylene terephthalate or a modified polyester predominantly comprising polyethylene terephthalate.
6. A fiber as claimed in claim 1, wherein the said polyesterether is polyethylene oxybenzoate or a copolymer predominantly comprising polyethylene oxybenzoate.
7. A fiber as claimed in claim 1, wherein the polymer composition consists of 99.9–70% by weight of a thermoplastic synthetic linear polyester or polyesterether and 0.1–30% by weight of at least one sulphonic acid containing compound as defined.

8. A fiber as claimed in claim 1, wherein the polymer composition consists of 99.5–90% by weight of a polyester or polyesterether and 0.5–10% by weight of at least one sulphonic acid containing compound as defined.

9. A fiber as claimed in claim 1, wherein the sulphonic acid containing compound has at least one active group other than the sulphonic acid group, which active group is an active chlorine, unsaturated methylene or epoxy group and may link with another active group in the polyester or polyesterether.

10. A fiber as claimed in claim 1, which has been subjected to a hot drawing.

References Cited

UNITED STATES PATENTS

| 3,314,920 | 4/1967 | Sakurai | 260—75 S |
|---|---|---|---|
| 3,538,057 | 11/1970 | Lafoe | 260—75 S |
| 3,560,591 | 2/1971 | Tanaka | 260—860 |
| 3,583,941 | 6/1971 | Trapasso | 260—75 S |
| 3,639,352 | 2/1972 | Katsuura | 260—75 S |
| 3,657,193 | 4/1972 | Caldwell | 260—75 S |

PAUL LIEBERMAN, Primary Examiner

U.S. Cl. X.R.

260—2 Ep, 47 R, 47 Eq, 75 A, 75 Ep, 75 R, 75 S, 75 T, 830 S, 860